US008295301B2

(12) United States Patent
Yonge, III et al.

(10) Patent No.: US 8,295,301 B2
(45) Date of Patent: Oct. 23, 2012

(54) MANAGING COEXISTENCE AMONG SIGNALING PROTOCOLS ON A SHARED MEDIUM

(75) Inventors: Lawrence W. Yonge, III, Ocala, FL (US); Srinivas Katar, Gainesville, FL (US); William E. Earnshaw, Ocala, FL (US); Stefano Galli, New York, NY (US); Akio Kurobe, Osaka (JP); Hisao Koga, Fukuoka (JP); Nobutaka Kodama, Fukuoka (JP); Jose Abad Molina, Malaga (ES); Oleg Logvinov, East Brunswick, NJ (US); Paul Dixon, Carrollton, TX (US); Olivier Isson, Bourg la Reine (FR)

(73) Assignee: Qualcomm Atheros, Inc., San Jose, CA (US)

( * ) Notice: Subject to any disclaimer, the term of this patent is extended or adjusted under 35 U.S.C. 154(b) by 649 days.

(21) Appl. No.: 12/485,468

(22) Filed: Jun. 16, 2009

(65) Prior Publication Data
US 2010/0074243 A1 Mar. 25, 2010

Related U.S. Application Data

(60) Provisional application No. 61/073,024, filed on Jun. 16, 2008.

(51) Int. Cl.
*H04J 3/06* (2006.01)
*H04L 12/43* (2006.01)
*H04L 12/413* (2006.01)
*H04L 27/00* (2006.01)

(52) U.S. Cl. ......... 370/458; 370/503; 370/509; 375/259
(58) Field of Classification Search .................. None
See application file for complete search history.

(56) References Cited

U.S. PATENT DOCUMENTS

| 4,689,786 | A | 8/1987 | Sidhu et al. |
| 4,807,248 | A | 2/1989 | Pyatt et al. |
| 5,732,076 | A | 3/1998 | Ketseoglou |
| 6,141,355 | A | 10/2000 | Palmer et al. |

(Continued)

FOREIGN PATENT DOCUMENTS
EP 1748597 1/2007

OTHER PUBLICATIONS

Faure, Jean-Philippe et al., Call for Submissions. Draft Standard for Broadband over Power Line Networks: Medium Access Control and Physical Layer Specifications. Feb. 14, 2007, 4 pages.

(Continued)

*Primary Examiner* — Marcus R Smith
(74) *Attorney, Agent, or Firm* — DeLizio Gilliam, PLLC

(57) ABSTRACT

Communication systems that use different physical layer (PHY) protocols can coexist on a communication medium (e.g., a powerline medium) by using an Inter-PHY Protocol (IPP). The different protocols may use different signal modulation schemes but still may have some features in common. The IPP includes a resource sharing mechanism that regulates access to the communication medium by devices functioning as communication devices (for example, devices communicating over a power line). A subset of devices that communicate among each other form a logical network that shares the medium with other logical networks that use either the same PHY protocol or a different PHY protocol.

35 Claims, 13 Drawing Sheets

U.S. PATENT DOCUMENTS

| | | |
|---|---|---|
| 7,609,681 B2 | 10/2009 | Kurobe et al. |
| 2002/0097679 A1 | 7/2002 | Berenbaum |
| 2002/0122411 A1 | 9/2002 | Zimmerman et al. |
| 2002/0141417 A1 | 10/2002 | Umayabashi |
| 2003/0048183 A1 | 3/2003 | Vollmer et al. |
| 2003/0137993 A1 | 7/2003 | Odman |
| 2004/0165532 A1 | 8/2004 | Poor et al. |
| 2004/0264428 A1 | 12/2004 | Choi et al. |
| 2005/0001694 A1 | 1/2005 | Berkman |
| 2005/0089005 A1 | 4/2005 | Sakoda et al. |
| 2005/0169222 A1 | 8/2005 | Ayyagari et al. |
| 2005/0190785 A1 | 9/2005 | Yonge, III et al. |
| 2005/0210157 A1 | 9/2005 | Sakoda |
| 2007/0025244 A1 | 2/2007 | Ayyagari et al. |
| 2007/0025391 A1 | 2/2007 | Yonge, III et al. |
| 2007/0025398 A1 | 2/2007 | Yonge, III |
| 2007/0121676 A1* | 5/2007 | Koga et al. .................... 370/482 |
| 2007/0220570 A1 | 9/2007 | Dawson et al. |
| 2007/0271398 A1 | 11/2007 | Manchester et al. |
| 2009/0238288 A1* | 9/2009 | Kodama et al. ............... 375/259 |

OTHER PUBLICATIONS

Faure, Jean-Philippe et al., Coexistence/interoperability Cluster, FTR SG Requirements. Draft Standard for Broadband over Power Line Networks: Medium Access Control and Physical Layer Specifications. Feb. 5, 2007, 13 pages.

International Search Report and Written in Opinion in PCT Application No. PCT/US2008/065831, Feb. 20, 2009, 22 pages.

International Search Report and Written in Opinion in PCT Application No. PCT/US2009/047530, Aug. 27, 2009, 9 pages.

* cited by examiner

| Ca | Ø(Ca) | Ca | Ø(Ca) | Ca | Ø(Ca) | Ca | Ø(Ca) | Ca | Ø(Ca) | Ca | Ø(Ca) | Ca | Ø(Ca) | Ca | Ø(Ca) |
|---|---|---|---|---|---|---|---|---|---|---|---|---|---|---|---|
| 0 | π | 32 | 0 | 64 | 0 | 96 | 0 | 128 | 0 | 160 | 0 | 192 | 0 | 224 | π |
| 1 | 0 | 33 | 0 | 65 | 0 | 97 | π | 129 | 0 | 161 | 0 | 193 | 0 | 225 | π |
| 2 | 0 | 34 | 0 | 66 | 0 | 98 | π | 130 | 0 | 162 | 0 | 194 | π | 226 | π |
| 3 | 0 | 35 | 0 | 67 | π | 99 | π | 131 | 0 | 163 | 0 | 195 | 0 | 227 | π |
| 4 | 0 | 36 | 0 | 68 | 0 | 100 | π | 132 | 0 | 164 | π | 196 | π | 228 | π |
| 5 | 0 | 37 | π | 69 | π | 101 | π | 133 | 0 | 165 | π | 197 | 0 | 229 | π |
| 6 | 0 | 38 | π | 70 | 0 | 102 | π | 134 | π | 166 | 0 | 198 | π | 230 | π |
| 7 | π | 39 | 0 | 71 | π | 103 | π | 135 | 0 | 167 | 0 | 199 | 0 | 231 | 0 |
| 8 | 0 | 40 | 0 | 72 | 0 | 104 | 0 | 136 | 0 | 168 | π | 200 | π | 232 | 0 |
| 9 | 0 | 41 | π | 73 | π | 105 | 0 | 137 | 0 | 169 | π | 201 | π | 233 | 0 |
| 10 | 0 | 42 | π | 74 | π | 106 | 0 | 138 | π | 170 | 0 | 202 | π | 234 | 0 |
| 11 | π | 43 | 0 | 75 | π | 107 | 0 | 139 | 0 | 171 | π | 203 | π | 235 | π |
| 12 | 0 | 44 | π | 76 | π | 108 | π | 140 | 0 | 172 | 0 | 204 | π | 236 | π |
| 13 | 0 | 45 | 0 | 77 | π | 109 | π | 141 | π | 173 | π | 205 | 0 | 237 | π |
| 14 | π | 46 | π | 78 | 0 | 110 | π | 142 | π | 174 | 0 | 206 | π | 238 | 0 |
| 15 | π | 47 | 0 | 79 | π | 111 | 0 | 143 | 0 | 175 | 0 | 207 | 0 | 239 | π |
| 16 | 0 | 48 | 0 | 80 | 0 | 112 | π | 144 | 0 | 176 | π | 208 | 0 | 240 | π |
| 17 | 0 | 49 | π | 81 | 0 | 113 | π | 145 | 0 | 177 | π | 209 | π | 241 | π |
| 18 | 0 | 50 | π | 82 | π | 114 | π | 146 | π | 178 | π | 210 | 0 | 242 | π |
| 19 | π | 51 | π | 83 | 0 | 115 | π | 147 | 0 | 179 | 0 | 211 | π | 243 | 0 |
| 20 | 0 | 52 | 0 | 84 | π | 116 | 0 | 148 | π | 180 | 0 | 212 | 0 | 244 | 0 |
| 21 | π | 53 | 0 | 85 | 0 | 117 | 0 | 149 | π | 181 | π | 213 | 0 | 245 | π |
| 22 | π | 54 | π | 86 | 0 | 118 | π | 150 | π | 182 | π | 214 | 0 | 246 | 0 |
| 23 | π | 55 | π | 87 | 0 | 119 | 0 | 151 | 0 | 183 | π | 215 | π | 247 | π |
| 24 | 0 | 56 | π | 88 | π | 120 | π | 152 | π | 184 | π | 216 | π | 248 | π |
| 25 | π | 57 | π | 89 | π | 121 | π | 153 | 0 | 185 | 0 | 217 | 0 | 249 | 0 |
| 26 | 0 | 58 | 0 | 90 | 0 | 122 | 0 | 154 | π | 186 | π | 218 | π | 250 | 0 |
| 27 | π | 59 | π | 91 | π | 123 | 0 | 155 | π | 187 | π | 219 | π | 251 | π |
| 28 | π | 60 | π | 92 | π | 124 | π | 156 | 0 | 188 | 0 | 220 | π | 252 | 0 |
| 29 | 0 | 61 | 0 | 93 | π | 125 | 0 | 157 | π | 189 | π | 221 | 0 | 253 | 0 |
| 30 | π | 62 | π | 94 | 0 | 126 | π | 158 | π | 190 | 0 | 222 | 0 | 254 | 0 |
| 31 | π | 63 | 0 | 95 | 0 | 127 | π | 159 | 0 | 191 | 0 | 223 | 0 | 255 | 0 |

FIG. 12

MANAGING COEXISTENCE AMONG SIGNALING PROTOCOLS ON A SHARED MEDIUM

CROSS-REFERENCE TO RELATED APPLICATIONS

This application claims priority to U.S. Application Ser. No. 61/073,024, filed on Jun. 16, 2008, incorporated herein by reference.

TECHNICAL FIELD

The invention relates to managing coexistence among signaling protocols on a shared medium.

BACKGROUND

A network of communication devices can share a communication medium (e.g., wires connecting multiple devices) using any of a variety of techniques. Some networks include mechanisms that enables various devices and systems to coexist sharing communication resources (e.g., frequency and time) when installed in a network with common electrical wiring.

SUMMARY

In one aspect, in general, a method for communicating among multiple devices over a shared communication medium. The method includes, in a schedule among multiple subsets of the devices that includes at least one respective time slot for each subset, transmitting from at least one of the devices in a given subset a presence signal associated with the given subset within a time slot for the given subset. A presence signal associated with a given subset is configured to indicate the presence of at least one device in the given subset. The method also includes communicating among devices in a given subset based on presence signals detected from one or more devices in at least one different subset.

Aspects can include one or more of the following features.

Respective presence signals associated with different subsets are unique.

Respective presence signals associated with different subsets include multiple carrier frequencies modulated using a unique sequence of phases.

The sequence of phases comprises a sequence of two phase values that differ by 180 degrees.

The sequence of phases is determined from a stored list of phases starting at a given offset, where each unique sequence of phases starts at a different offset.

The schedule is a recurring schedule in which the time slots are synchronized to an alternating current line cycle on the shared communication medium.

The time slots are at different predetermined offsets from a zero crossing of the alternating current line cycle.

The predetermined offsets are in proximity to the zero crossing of the alternating current line cycle.

The time slots each include time reserved for one of the presence signals and time margins on either side that enable one of the presence signals to be identifiable when the zero crossing is not accurately detected.

During the time slots, devices that are not transmitting presence signals scan for presence signals.

The method further includes synchronizing to a detected zero crossing at a device in a first subset in response to receipt of a resynchronization signal from a device in a second subset different from the first subset.

The resynchronization signal is transmitted from the device in the second subset in a time slot following a time slot in which a presence signal is transmitted from the device in the first subset.

The device in the second subset transmits the resynchronization signal in response to an indication from at least one device that one or more presence signals are out of synchronization.

A presence signal is out of synchronization if it is detected outside of a time slot for a subset with which the presence signal is associated.

The schedule includes at least one presence signal time slot for each subset and time intervals including communication time slots allocated for communicating among devices in a given subset.

The method further includes requesting to share the time intervals among devices of different subsets using either time division multiplexing or frequency division multiplexing based on signals sent during the time slots.

A device rejects a request to use frequency division multiplexing to select use of time division multiplexing to share the time intervals among devices of different subsets.

Presence signals sent by devices of at least one subset are coordinated by a master device for that subset.

The method further includes devices in a subset communicating detected presence signal information to the master for that subset.

At least one device in a subset transmits presence signals for that subset.

Multiple devices in a subset transmit presence signals for that subset.

All devices in a subset transmit presence signals for that subset.

Multiple devices in a subset that transmit presence signals for that subset transmit identical presence signals.

The identical presence signals add constructively so that the identical presence signals are distinguishable from presence signals transmitted by devices in other subsets.

Detected presence signals below a threshold are ignored.

The presence signal time slots for transmitting presence signals are separated by time intervals including communication time slots allocated for communicating among devices in a given subset.

Time slots are assigned to a given subset based on subsets identified by the presence signals.

A first time slot assigned to a first subset and a second time slot assigned to a second subset are separated by a silence margin.

The method further includes assigning time slots to subsets based on at least one of latency and throughput.

Time slots are assigned for a given subset spread over most of the time interval to provide low latency.

Time slots are assigned for a given subset contiguously within the time interval to provide high throughput.

The method further includes a device in a first subset using a time slot assigned to a second subset when no device in the second subset communicates during one or more slots previously assigned to the second subset.

A device in the first subset requests permission from a master device before using the time slot assigned to the second subset.

A device in the first subset uses the time slot assigned to the second subset after determining that a signal to noise ratio suggests interference with a device in the second subset is improbable.

A device in a first subset requests use of all of the time slots in a given interval for use by one or more devices in the first subset.

Devices in different subsets use different physical layer protocols.

Devices in different subsets use signals that overlap in their spectra.

At least one of the subsets utilizes orthogonal frequency-division multiplexing.

In another aspect, in general, a system includes: a communication medium; a first subset of devices coupled to the communication medium; and a second subset of devices coupled to the communication medium. At least one of the devices in a given subset of multiple subsets of devices, including at least the first and second subsets of devices, is configured to: transmit a presence signal associated with the given subset within a time slot for the given subset according to a schedule that includes at least one respective time slot for each subset, where a presence signal associated with a given subset is configured to indicate the presence of at least one device in the given subset, and communicate among other devices in the given subset based on presence signals detected from one or more devices in at least one different subset.

Among the many advantages of the invention (some of which may be achieved only in some of its various aspects and implementations) are the following.

The techniques provide unique signals for different systems transmitted in a round-robin fashion that enables efficient detection of the different systems. These signals also enable the coexistence procedures to be resilient to errors in tracking time references associated with local powerline signal features (e.g., a local zero crossing). For example, since each signal is unique various devices will not get confused if there are significant AC zero crossing offsets between different systems. The techniques enable low cost zero cross detectors. For example, low cost zero cross detectors may not actually track the exact zero cross location but may track a fixed location with respect to the zero cross. Devices may differ in their interpretation of the zero cross but they can still synchronize by measuring the offset at which the unique signal comes relative to their local zero cross. The techniques are tolerant to large phase shifts (e.g., from capacitive or inductive loads) between different system locations (e.g., different homes). In some cases, systems can operate independently and do not have to share bandwidth with networks that are far enough to not cause significant interference.

Other aspects and advantages will be apparent from the detailed description, drawings, appendices and claims.

DESCRIPTION OF DRAWINGS

FIG. 12 is a table of phase vectors.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
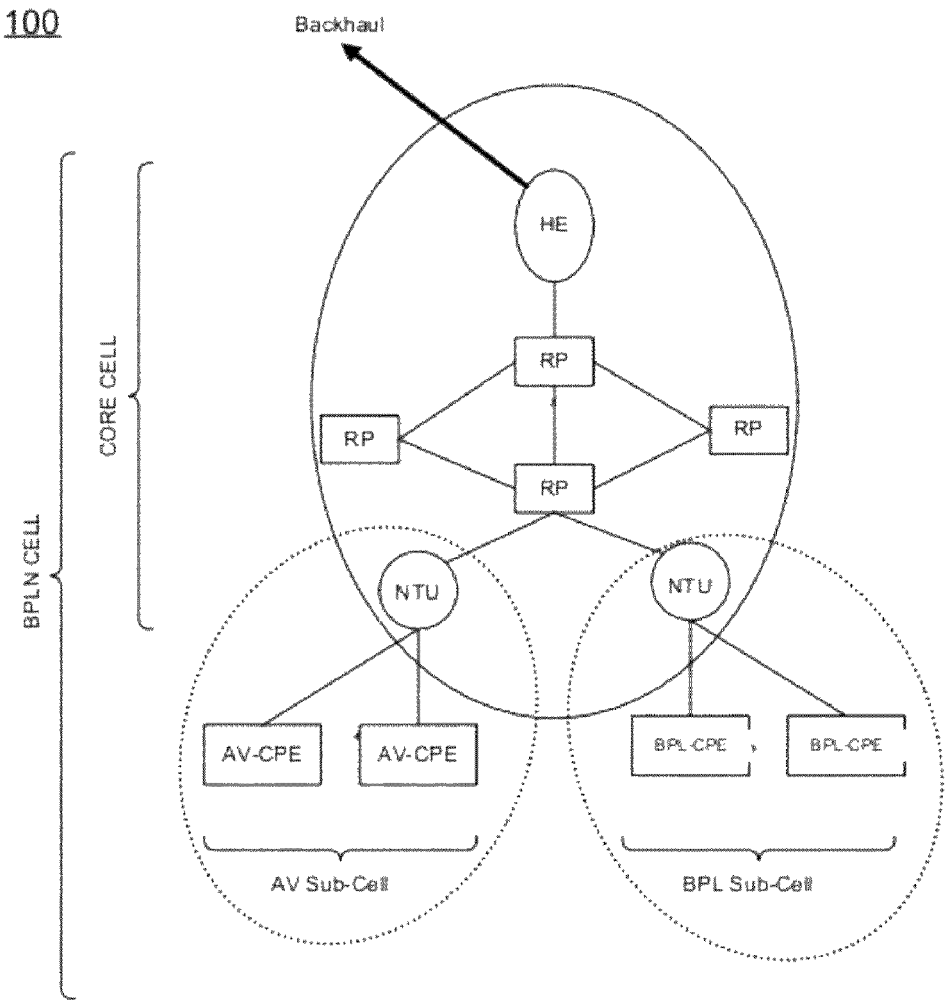
FIG. 1 is a schematic diagram of a communication network.

FIG. 1 shows an exemplary network configuration for an access network 100 such as a Broadband Power Line Network (BPLN) that provides access to a backhaul network. A BPLN can be managed by a service provider entity having access to the underlying physical power line medium. A BPLN is a general purpose network that can be used for several types of applications including, smart grid management, broadband internet access, voice and video delivery services, etc. In various implementations, a BPLN can be deployed on low voltage, medium voltage and high voltage power lines. Additionally, a BPLN can span an entire neighborhood or it may be deployed within a single multi-dwelling unit. For example, it can be used to provide network service to tenants in a single apartment building. While power lines are one medium for deploying the BPLN, similar techniques can be deployed on other wire lines, such as, for example, coaxial cables, twisted pair or a combination thereof.

A BPLN can include one or more Cells. A cell is a group of broadband power line (BPL) devices in a BPLN that have similar characteristics such as association management, security, Quality of Service (QoS) and channel access settings, for example. Cells in a BPLN are logically isolated from each other, and communication to and from the backhaul occurs within the cell. Each cell in a BPLN includes a Core-Cell and may also include one or more Sub-Cells. There can be more than one cell on a given physical power line medium.

Some Cells may use different protocols, including different PHY protocols. For example, an In-Home AV Sub-Cell may use an In-Home AV PHY protocol, and an Access BPL Sub-Cell may use an Access BPL PHY protocol. The techniques described herein can be used to enable Cells using different PHY protocols to coexist in the network 100.

A Core-Cell includes a group of devices in a BPLN that can share certain functionality such as a common security protocol. An exemplary Core-Cell includes a Head End (HE), Repeaters (R), and Network Termination Units (NTUs), but may exclude Customer Premise Equipment (CPE). The Head End (HE) is a device that bridges a cell to the backhaul network. At a given time, a cell will have one active Head End and the Head End manages the cell including the Core-Cell and any associated Sub-Cells. A Repeater (RP) is a device that selectively retransmits MSDUs to extend the effective range and bandwidth of the BPLN Cell. Repeaters can also perform routing and QoS functions. The NTU is a device that connects a BPLN cell to the end users' network or devices. The NTU may in some cases bridge to other network technologies such as WiFi. A single NTU can serve more than one customer. Each Sub-Cell is associated with an active NTU. In some implementations, an HE, an NTU and/or an RP can be co-located at a single station. Thus, a single device may be designed to perform multiple functions. For example, a single device can simultaneously be programmed to perform the tasks associated with an RP and an NTU.

Various types of CPE devices (e.g., a computer) can be used as endpoint devices in the network and such devices can communicate with other devices in the network through the NTU, any number of repeaters, (e.g., including no repeaters), and the Head End. Each device in the network communicates as a communication "station" using a PHY layer protocol that is used by the devices to send transmissions to any other devices that are close enough to successfully receive the transmissions. Devices that cannot directly communicate with each other use one or more repeater devices to communicate with each other. The devices have the potential to interfere with each other, but techniques can be used to coordinate in a centralized and/or distributed manner.

Any of a variety of communication system architectures can be used to implement the portion of the network interface module that converts data to and from a signal waveform that is transmitted over the communication medium. An application running on a device provides and receives data to and from the network interface module in segments. A "MAC Service Data Unit" (MSDU) is a segment of information received by the MAC layer. The MAC layer can process the received MSDUs and prepares them to generate "MAC protocol data units" (MPDUs). An MPDU is a segment of information including a header (e.g., with management and overhead information) and payload fields that the MAC layer has asked the PHY layer to transport. An MPDU can have any of a variety of formats based on the type of data being transmitted. A "PHY Protocol Data Unit (PPDU)" refers to the modulated signal waveform representing an MPDU that is transmitted over the power line by the physical layer.

Apart from generating MPDUs from MSDUs, the MAC layer can provide several functions including channel access control, providing the required QoS for the MSDUs, retransmission of corrupt information, routing and repeating. Channel access control enables devices to share the powerline medium. Several types of channel access control mechanisms like carrier sense multiple access with collision avoidance (CSMA/CA), centralized Time Division Multiple Access (TDMA), distributed TDMA, token based channel access, etc., can be used by the MAC. Similarly, a variety of retransmission mechanism can also be used. The Physical layer (PHY) can also use a variety of techniques to enable reliable and efficient transmission over the transmission medium (power line, coax, twisted pair etc). Various modulation techniques like Orthogonal Frequency Division Multiplexing (OFDM) or Wavelet modulations can be used. Forward error correction (FEC) code line Viterbi codes, Reed-Solomon codes, concatenated code, turbo codes such as convolution turbo code, low density parity check code, etc., can be employed by the PHY to overcome errors.

One implementation of the PHY layers is to use OFDM modulation. In OFDM modulation, data are transmitted in the form of OFDM "symbols." Each symbol has a predetermined time duration or symbol time $T_s$. Each symbol is generated from a superposition of N sinusoidal carrier waveforms that are orthogonal to each other and form the OFDM carriers. Each carrier has a peak frequency $f_i$ and a phase $\Phi_i$ measured from the beginning of the symbol. For each of these mutually orthogonal carriers, a whole number of periods of the sinusoidal waveform is contained within the symbol time $T_s$. Equivalently, each carrier frequency is an integral multiple of a frequency interval $\Delta f=1/T_s$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies $f_1$ and $f_N$ referred to as the OFDM bandwidth.

Figure 2:
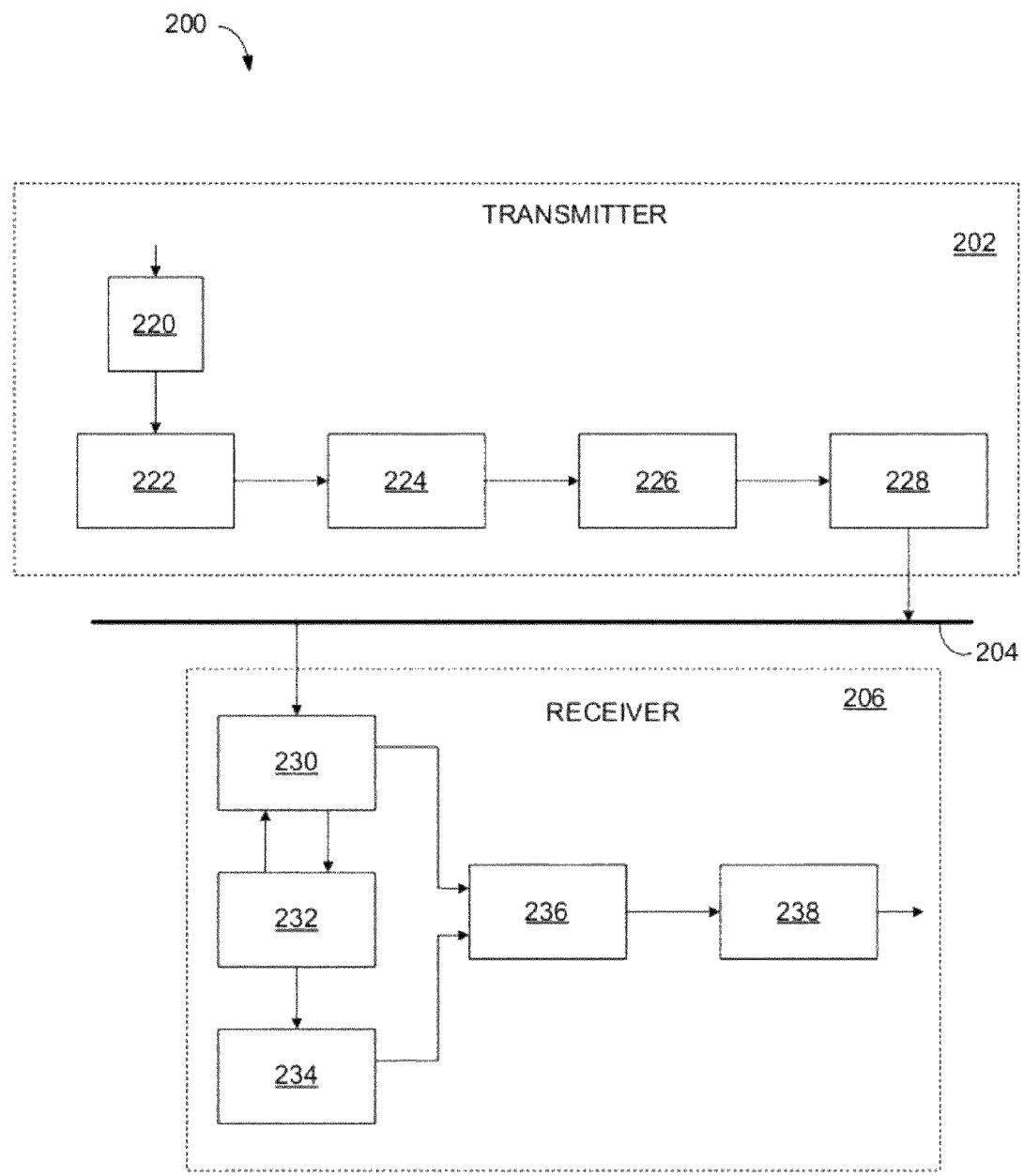
FIG. 2 is a block diagram of communication modules for communicating over the network.

Referring to FIG. 2, a communication system 200 includes a transmitter 202 for transmitting a signal (e.g., a sequence of OFDM symbols) over a communication medium 204 to a receiver 206. The transmitter 202 and receiver 206 can both be incorporated into a network interface module at each station. The communication medium 204 can represent a path from one device to another over the power line network.

At the transmitter 202, modules implementing the PHY layer receive an MPDU from the MAC layer. The MPDU is sent to an encoder module 220 to perform processing such as scrambling, error correction coding and interleaving.

The encoded data is fed into a mapping module 222 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i=A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 222 also determines which of the carrier frequencies $f_1, \ldots, f_N$ within the OFDM bandwidth are used by the system 200 to transmit information. For example, some carriers that are experiencing fades can be avoided, and no information is transmitted on those carriers. Instead, the mapping module 222 uses coherent BPSK modulated with a binary value from the Pseudo Noise (PN) sequence for that carrier. For some carriers (e.g., a carrier i=10) that correspond to restricted bands (e.g., an amateur radio band) on a medium 204 that may radiate power no energy is transmitted on those carriers (e.g., $A_{10}$=0). The mapping module 222 also determines the type of modulation to be used on each of the carriers (or "tones") according to a "tone map." The tone map can be a default tone map, or a customized tone map determined by the receiving station, as described in more detail below.

An inverse discrete Fourier transform (IDFT) module 224 performs the modulation of the resulting set of N complex numbers (some of which may be zero for unused carriers) determined by the mapping module 222 onto N orthogonal carrier waveforms having peak frequencies $f_1, \ldots, f_N$. The modulated carriers are combined by IDFT module 224 to form a discrete time symbol waveform S(n) (for a sampling rate $f_R$), which can be written as $$S(n) = \sum_{i=1}^{N} A_i \exp[j(2\pi i n/N + \Phi_i)] \qquad \text{Eq. (1)}$$

where the time index n goes from 1 to N, Ai is the amplitude and $\Phi_i$ is the phase of the carrier with peak frequency $f_i=(i/N)f_R$, and $j=\sqrt{-1}$. In some implementations, the discrete Fourier transform corresponds to a fast Fourier transform (FFT) in which N is a power of 2.

A post-processing module 226 combines a sequence of consecutive (potentially overlapping) symbols into a "symbol set" that can be transmitted as a continuous block over the communication medium 204. The post-processing module 226 prepends a preamble to the symbol set that can be used for automatic gain control (AGC) and symbol timing synchronization. To mitigate intersymbol and intercarrier interference (e.g., due to imperfections in the system 200 and/or the communication medium 204) the post-processing module 226 can extend each symbol with a cyclic prefix that is a copy of the last part of the symbol. The post-processing module 226 can also perform other functions such as applying a pulse shaping window to subsets of symbols within the symbol set (e.g., using a raised cosine window or other type of pulse shaping window) and overlapping the symbol subsets.

An Analog Front End (AFE) module 228 couples an analog signal containing a continuous-time (e.g., low-pass filtered) version of the symbol set to the communication medium 204. The effect of the transmission of the continuous-time version of the waveform S(t) over the communication medium 204 can be represented by convolution with a function $g(\tau;t)$ representing an impulse response of transmission over the communication medium. The communication medium 204 may add noise n(t), which may be random noise and/or narrowband noise emitted by a jammer.

At the receiver 206, modules implementing the PHY layer receive a signal from the communication medium 204 and generate an MPDU for the MAC layer. An AFE module 230 operates in conjunction with an Automatic Gain Control (AGC) module 232 and a time synchronization module 234 to provide sampled signal data and timing information to a discrete Fourier transform (DFT) module 236.

After removing the cyclic prefix, the receiver 206 feeds the sampled discrete-time symbols into DFT module 236 to extract the sequence of N complex numbers representing the encoded data values (by performing an N-point DFT). Demodulator/Decoder module 238 maps the complex numbers onto the corresponding bit sequences and performs the appropriate decoding of the bits (including de-interleaving and descrambling).

Any of the modules of the communication system 200 including modules in the transmitter 202 or receiver 206 can be implemented in hardware, software, or a combination of hardware and software.

Communication systems that use different physical layer (PHY) protocols can coexist on a communication medium (e.g., a powerline medium) by using an Inter-PHY Protocol (IPP). In some implementations, the different protocols may use different signal modulation schemes but still may have some features in common. For example, the different protocols may be compliant with a common set of guidelines or a common specification (e.g., the IEEE 1901 Specifications). The IPP includes a resource sharing mechanism that regulates access to the communication medium by devices functioning as communication devices (for example, devices communicating over a power line). A subset of devices that communicate among each other (using a common PHY protocol) form a logical network that shares the medium with other logical networks that use either the same PHY protocol or a different PHY protocol. One or more subsets of stations using the same PHY protocol may be spread throughout a physical network such that the subsets (even if they do not all communicate with each other) together form a logical "communication system" that shares the medium with other communication systems that use different PHY protocols. Subsets of stations that share the same PHY protocol may be referred to as belonging to the same System Category. In some implementations, different subsets of devices use different PHY protocols but may use a common medium access control (MAC) protocol.

In one embodiment, an IPP provides resource sharing among one or more subsets of access (AS) devices and one or more subsets of in-home devices (IH) that have the P1901 common MAC and either the Wavelet OFDM IEEE 1901 PHY or the Windowed FFT OFDM IEEE 1901 PHY. Some Coexistence Protocols (CXPs) defined in some co-existence specifications use a more general resource sharing mechanism that allows non-IEEE 1901 devices to share efficiently resources with each other and with IEEE 1901 devices. In some implementations, IPP is compatible with some other forms of CXP protocols.

For example, a BPL system is a communication system using the powerline as a medium to transmit and receive information. The BPL system may consist of one master device and one or more slave devices. In this example, IPP provides resource sharing between an Access System Category (AS also called "A"), and in-home systems (IH). The in-home systems may belong to the Wavelet OFDM PHY System Category (IH-W also called "W") or using the Windowed OFDM PHY System Category (IH-O also called "O").

In some embodiments, the IPP handles the situation when multiple System Categories are in range of each other, i.e. when one or more devices of a System Category can interfere with one of more devices of a different System Category. For example, the protocol coordinates coexistence between an access system and one or more in-home systems, regardless of the PHY as well as coexistence among different in-home systems utilizing different IEEE 1901 PHYs.

When multiple subsets of devices share the same electrical wires, the IPP can define a set of policies for regulating resource sharing. For example, when both Access System Categories and In-Home System Categories are in range of each other, the defined policies may allocate that 50% of the channel resources be available to the Access System Category and 50% of the channel resources be available to all the In-Home System Categories. In another example, when only an In-Home System Categories are in range of each other, the defined policies may direct channel resources be shared equally; thus, 50% of channel resources be assigned to a System Category that uses the Windowed FFT OFDM and 50% of channel resources will be assigned to System Category that uses the Wavelet OFDM PHY.

In some arrangements, devices within a System Category indicate their presence by transmitting a predetermined unique presence signal. For example, an exemplary waveform used as these presence signals is a Commonly Distributed Coordination Function (CDCF) signal defined below. The CDCF signal may be transmitted by all systems including when only one System Category is present.

On the basis of the detected CDCF signals, devices sharing the same medium are able to determine the network status, which indicates the System Categories that are in interference range. Depending on the network status, different resource allocations will be carried out.

The IPP Window

In some arrangements, a CDCF signal is transmitted during an IPP Window, a region of time used by devices for transmitting/detecting one or more CDCF signals. The IPP Window occurs periodically, for example, the period may be a multiple of the line cycle in a BPL system. The IPP Window may occur alone or immediately followed by a CXP Window and the IPP Window and CXP window are further divided into several time slots called Fields.

Figure 3:
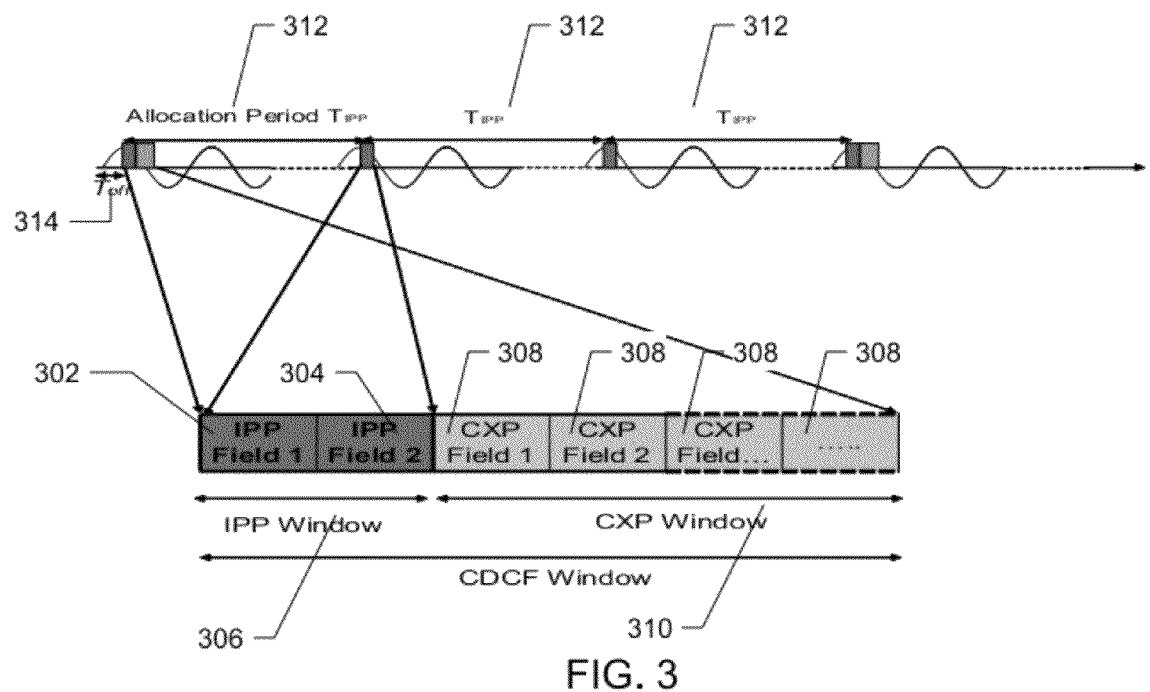
FIG. 3 is a plot of signals sent over a communications medium.

Referring to FIG. 3, in one arrangement the Inter PHY Protocol may be used to coordinate communication between an Access system category (A), an In Home Wavelet OFDM PHY system category (W), and an In Home Windowed OFDM PHY system category (O). In this arrangement, there are two IPP fields 302, 304 within the IPP Window 306 and multiple CXP Fields 308 within the CXP Window 310. The IPP Window 306 occurs every Allocation Period $T_{ipp}$ 312, whereas the CXP Window 310 occurs every three Allocation Periods 312. The CXP Fields 308 are used by the co-existence protocol (CXP) and are ignored by the IPP. Generally, devices detect IPP Fields 304, and optionally detect CXP fields 308. In some arrangements, during the IPP Window 306 as well as during the CXP Window 310, no device transmits anything except the appropriate CDCF signals.

The IPP window occurs at a fixed offset $T_{off}$ 314 relative to the underlying line cycle zero crossing. Since there are two zero crossings in a cycle and there are often up to three sections of wiring with different phases for their respective line cycles in a building, there are actually six possible zero crossings instances. Synchronization techniques allow all devices in range of each other to synchronize to a common zero crossing instance.

In some arrangements, every System Category uses an IPP window in a round robin fashion. For example, referring to FIG. 4A, Access system category devices use an IPP window 402, In-Home Wavelet OFDM System category devices use the subsequent IPP window 404, and In-Home Windowed OFDM system category devices use the next IPP Window 406, and so on in a round robin fashion.

In some arrangements, all devices that belong to the same System Category will transmit CDCF signals simultaneously in the IPP window assigned to their System Category. Every device will transmit CDCF signals in its IPP Window every three $T_{ipp}$ cycles. Every device will detect CDCF signals in the other two IPP Windows every $T_{ipp}$ to assess the Network Status. Every device, when not engaged in an active link with another device, will also continuously scan for CDCF signals outside the IPP Windows systems to detect the presence of other unsynchronized devices. If unsynchronized devices are detected, a re-synchronization procedure is started (to enable devices to synchronize to a common zero crossing instance).

In one arrangement, a device that is the only device belonging to a system category may detect unsynchronized devices and system categories while the device is not transmitting. In this arrangement, the device does not send CDCF signals inside the IPP Window but scans for CDCF signals continuously outside the IPP Windows to detect the presence of unsynchronized systems. For example, a device that it is connected to the Access network but it is alone regarding the In-Home side scans continually outside the IPP Window for unsynchronized devices on the In-Home side.

Devices can unequivocally determine the network status every three $T_{ipp}$ cycles (called an "IPP Period") in this example because there are three different System Categories that alternatively receive IPP Window in which to indicate their presence. The devices are able to update the network status every $T_{ipp}$ cycle. The network status of a device is determined by the system categories that are present on the shared medium and that can be detected by the device using the CDCF signals detected.

Figure 4A:
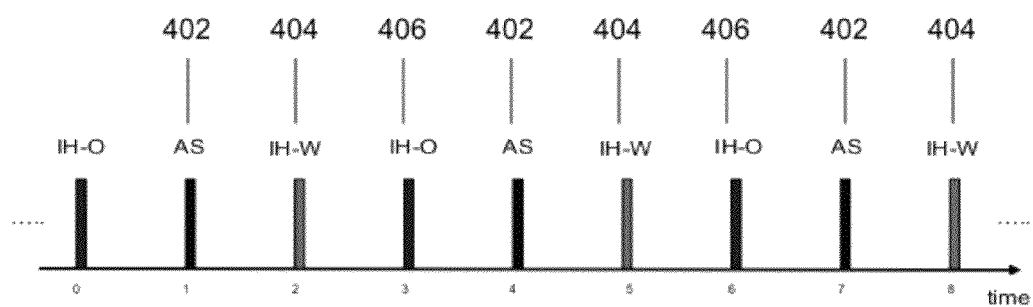
FIG. 4A is a schematic diagram of signals sent during consecutive IPP windows.
Figure 4B:
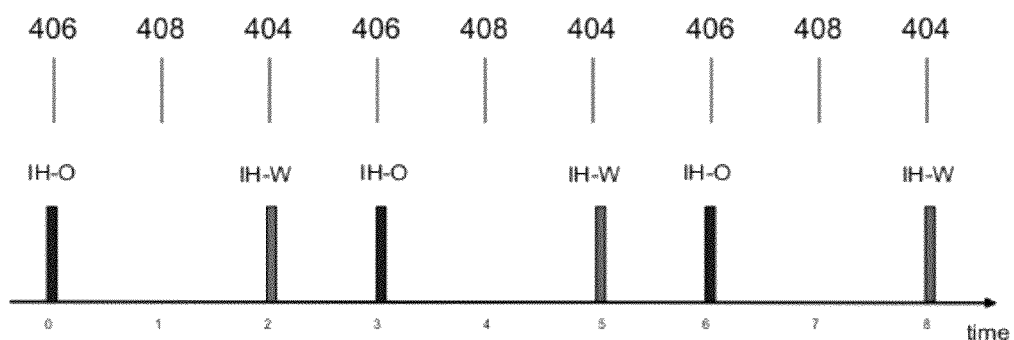
FIG. 4B is a schematic diagram of signals sent during consecutive IPP windows.

Referring to FIG. 4B, in this example, CDCF signals are not transmitted in the IPP Window assigned to the Access system category 408, thus indicating that no devices belonging to an Access system category are detected.

For example, referring to FIG. 4A, a device can detect the presence of all system categories since the device can detect CDCF signals that are transmitted in all three consecutive IPP windows 402, 404, 406. In this example, the Network Status indicates the presence of at least a device belonging to the Access (AS), In-Home Windowed (IH-O), and In-Home Wavelet OFDM (IH-W) system categories. In contrast, referring to FIG. 4B, in this example no CDCF signal is detected by a device during the IPP window allocated to Access system categories 408, so that the detected network status indicates only the presence of devices in the W and O system categories.

Depending on the network status, different resource allocations may be carried out as specified below. The system will share the available resources using the TDMA standard and the amount of resources given to each System Category will be decided on the basis of specific policies.

TDMA Structure

Figure 5:
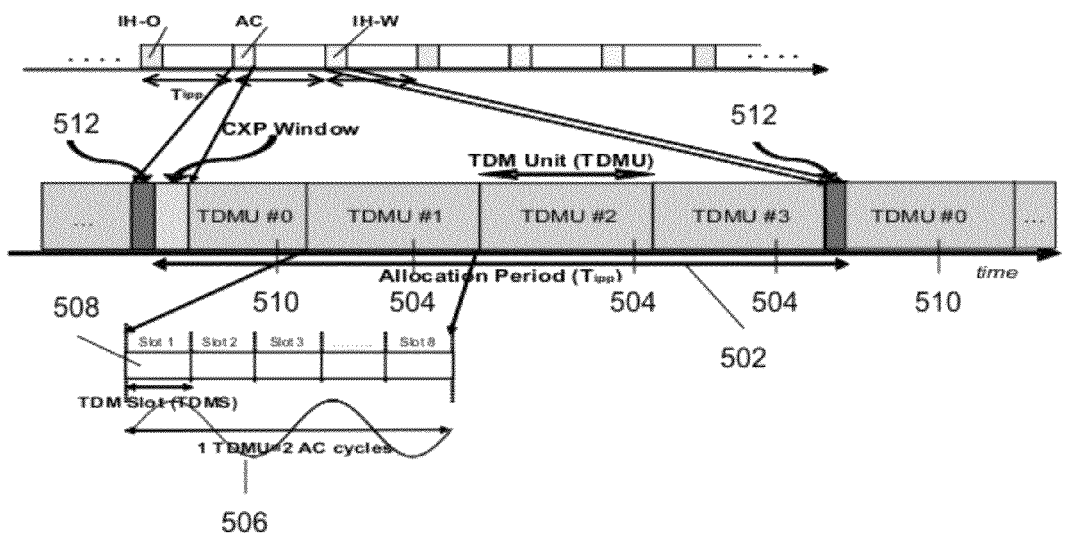
FIG. 5 is a schematic diagram of the usage of a communication medium using IPP with a TDMA schedule.

Referring to FIG. 5, a general TDMA schedule is shown. Within that schedule, an allocation period 502 lasts $T_{ipp}$ seconds and includes an IPP Window 512 and a time interval including time slots allocated for the devices within a given System Category to communicate with each other. This time interval allocated for communication can be shared among multiple System Categories using Time Division Multiplexing (TDM), for example, within each of four Time Division Multiplexing Units (TDMUs) 504. Alternatively, Frequency Division Multiplexing (FDM) can be used to share the allocated time among multiple System Categories. In a BPL system, the duration of a TDMU 504 may be equal to two power line cycles 506, and each TDMU 504, 510 may be further sub-divided into time slots called TDM slots 508 (TDMS), in this case eight TDMS within one TDMU. The duration of a TDMS may be defined by the duration of the power line cycle. For example, a 50 Hz power line cycle results in a TDMS duration of 5 milliseconds while a 60 Hz power line cycle results in a TDMS duration of 4.166 milliseconds. In one example, a TDMS is exclusively assigned to all the systems belonging to the same System Category and the allocation policy will be based on the network status.

Figure 6:
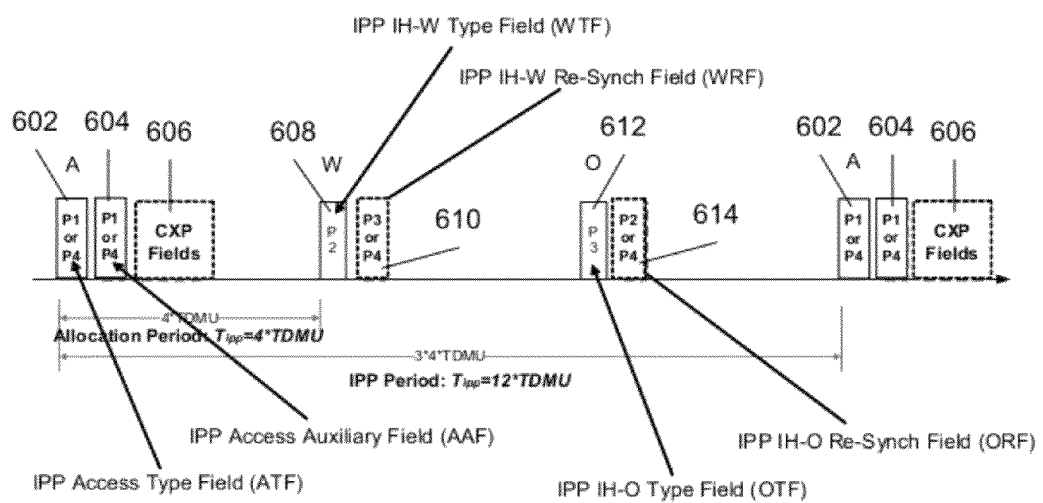
FIG. 6 is a schematic of fields and phase signals during an IPP window.

Referring to FIG. 5 and FIG. 6, the IPP Window 512 occurs at the beginning of TDMU #0 510 and IPP fields 602, 604 are present in every IPP window 512 whereas CXP Fields 606 are present only during the IPP window 512 assigned to the Access system categories 510. Therefore, the IPP window 512 occurs with a periodicity of one $T_{ipp}$ equal to four TDMUs, whereas the CXP window occurs with a periodicity of three $T_{ipp}$ equal to twelve TDMUs.

FIG. 6 shows one arrangement where the solid lines denote fields where CDCF signals are always transmitted if devices belonging to the appropriate System Category are present. Dashed lines denote fields where CDCF signals may or may not be present.

IPP Fields

Referring to FIG. 6, every IPP window is used in exclusivity by the devices that belong to a specific system category. For example, A, W, and O. The only exception is during the re-synchronization procedure when any system may transmit the CDCF signal in the second field of any system category (for example, the second field of an In-Home system category 610, 614).

In one arrangement, the first IPP window is used only by the devices that belong to the Access system category.

If there is an Access system category using the channel, all its devices transmit a CDCF signal to indicate their presence in IPP Field 1 602. The second IPP Field 604 is used to indicate resource needed or the request for TDM/FDM sharing policy and is called the IPP Access Auxiliary Field. If there is no Access system category present, no CDCF signals are transmitted in the IPP fields.

Each IPP Field may contain a CDCF signal sent using any of a multiple sets of phases (e.g., the phases described above for different carriers). In one arrangement there are four potential sets of phases with which CDCF signals may be sent. The set of phases with which the CDCF signal is sent may be used to communicate additional information. For example, in one arrangement CDCF signals sent in the first 602 and second 604 IPP fields of the A IPP Window are used with the following meaning:

- CDCF signal with a set of phases labeled "Phase P1" in the first IPP field 602 and Phase P1 in the second IPP field 604: one or more devices belonging to an Access system category are present, i.e. in interference range, in TDM mode and are asking for partial use of the bandwidth.
- CDCF signal with Phase P1 in the first IPP field 602 and with a set of phases labeled "Phase P4" in the second IPP field 604: access is present in TDM mode asking for complete use of the bandwidth.
- CDCF signal with Phase P4 in the first IPP field 602 and Phase P1 in the second IPP field 604: devices belonging to an Access system category are operating or requesting to switch to FDM mode using frequencies below a specified frequency (for example below, 10 MHz) on all TDMSs.
- CDCF signal with Phase P4 in the first IPP field 604 and Phase P4 in the second IPP field 604: devices belonging to an Access system category are operating or requesting to switch to FDM mode using frequencies below a specified range (for example, below 14 MHz) on all TDMSs.

In one arrangement, the second IPP window is used by the devices belonging to the In-Home Wavelet OFDM (W) system category. If there is a W system using the channel, all its devices transmit a CDCF signal to indicate their presence in IPP Field 1 608, using the CDCF signal with a set of phases labeled "Phase P2." The second IPP Field 610 may be used during the re-synchronization procedure and may be used to indicate lack of FDM capability. If there is no W present, no CDCF signals are transmitted in the IPP fields of this IPP Window.

More specifically, in this arrangement, the first 608 and second 610 IPP fields of the W IPP Window may be used to convey the following meaning:

- CDCF signal with a set of phases labeled "Phase P2" in first field 608: one or more devices belonging to an W system are present, i.e. within interference range.
- CDCF signal with a set of phases labeled "Phase P3" in second field 610: all devices that belong to that W system start a re-synchronization procedure.
- CDCF signal with a set of phases labeled "Phase P4" in second field 610: W devices cannot support FDM mode. This signal is sent only when an Access system category working in FDM mode is present in the channel. There is no conflict with Re-sync signal because if the In-Home system uses the field to indicate FDM availability to the Access system category, it means that it is already synchronized with the Access, so it cannot re-synchronized, so it will ignore any re-sync requirement. Therefore, the P4 signal present in second field 610 may indicate to any other system that the W system cannot perform re-synchronization because it is already synchronized with an Access system category.

Also in this arrangement, the third IPP window is used by the devices belonging to the In-Home Wavelet OFDM System Category (IH-O). If there is an O system using the channel, all its devices transmit a CDCF signal to indicate their presence in the first IPP Field 612, using the CDCF signal with Phase P3. The second IPP Field 614 may be used by the re-synchronization procedure, and is used to indicate lack of FDM capability. If there is no O present, no CDCF signals are generally transmitted in the IPP fields of this IPP Window.

More in detail, the first 612 and second 614 IPP fields of the O IPP Window are used with the following meaning:

- CDCF signal with Phase P3 in first field 612: one or more devices belonging to an O system are present, i.e. within interference range.
- CDCF signal with Phase P2 in second field 614: all devices that belong to an O system start the re-synchronization procedure.
- CDCF signal with Phase P4 in second field 614: O devices cannot support FDM mode. This signal is sent only when an Access system category working in FDM mode is present in the channel. There is no conflict with Re-sync signal because if the In-Home system uses the field to indicate FDM availability to the Access system category, it means that it is already synchronized with the Access, so it cannot re-synchronized, so it will ignore any re-sync requirement. Therefore, the P4 signal present in second field 614 may indicate to any other system that the O system cannot do re-synchronization because it is already synchronized with an Access system category.

In some arrangements, an FDM Access system category may indicates its mode and granularity (FDM partial or FDM full) in the appropriate CDCF Fields continuously in its corresponding IPP Window.

Figure 7:
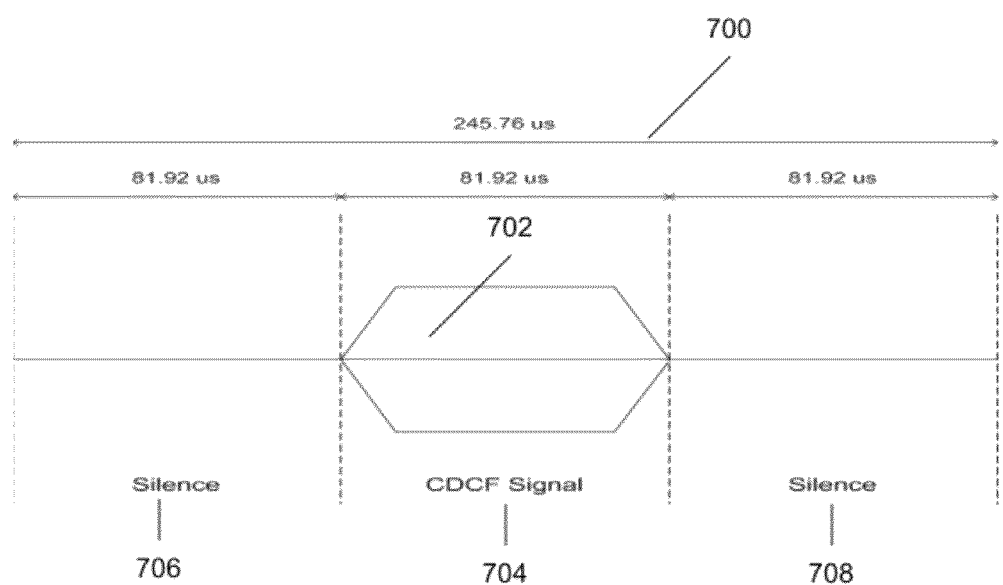
FIG. 7 is a schematic diagram of a CDCF signal sent during the middle of a communication opportunity.

Referring to FIG. 7, in some arrangements the CDCF signal 702 is sent inside an IPP field 700. The IPP field 700 may be divided into time reserved for the CDCF signal 704 and some time margins at left 706 and right 708 to allow for imperfect synchronization, imperfect zero crossing detection, load-induce phase shifts of the mains signal, etc. A system may listen to the CDCF signal during the entire IPP field 700 in order to detect it. Generally, the transmitter of the CDCF tries to send it in the middle of the IPP field 700.

TDMS Resource Allocation

Figure 8:
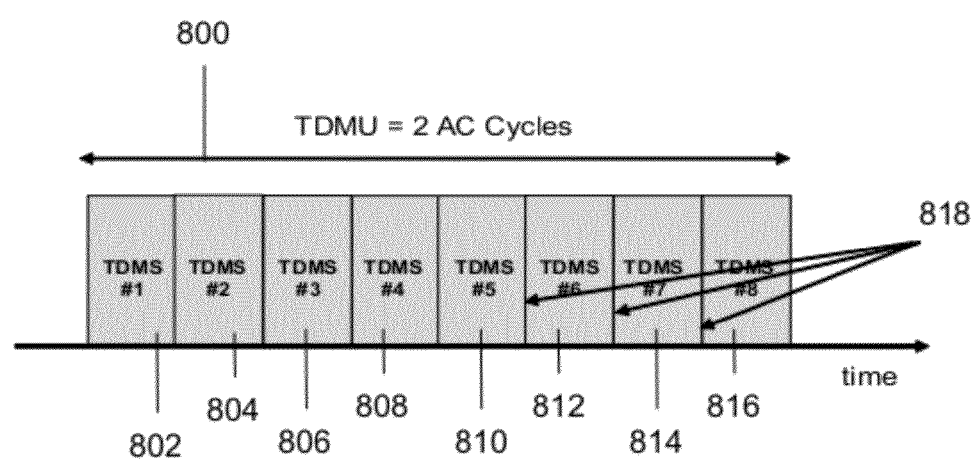
FIG. 8 is a schematic diagram of a TDMA schedule

The time unit employed for the schedule of the channel access is the TDMU (Time Domain Multiplexing Unit). Referring to FIG. 8, in one arrangement, one TDMU has a duration of two line cycles. The TDMU 800 is divided in eight TDMSs 802, 804, 806, 808, 810, 812, 814, 816 and each slot is assigned for the exclusive use of all the devices of a specific system category present on the channel. If two adjacent TDMSs (for example TDMS #5 810 and TDMS #6 812) are assigned to different system categories, then a silence margin may be placed across the TDMS boundary 818. The TDMS silence margin is twice the duration of the CDCF margin (706, 708 FIG. 7) and is centered on the TDMS boundary.

In general, the allocation of each TDMS depends on the network status. The network status sensed by a device may be different from the network status sensed by another device, even if the two devices belong to the same system category. This property of the network status allows some form of time-slot re-use to increase overall network throughput.

Many different policies may be implemented within the scope of this disclosure, for example as discussed above, one policy may allocate at least 50% of the available resources to the Access system categories and the in-home system categories receive the remaining resources. Policies should take into consideration certain design constraints. The general procedure for TDMS allocation is to start allocating TDMS for the case of a full network status (for example, for a network including A, W, O system categories each of which allocation is described as A, W and O respectively in FIG. 9 and FIG. 10), and then create the other allocations by assigning the TDMS of the absent system to the present systems. Moreover, in assigning TDMS to System Categories, it may be taken into consideration that there is trade-off between latency and throughput efficiency. For example, in a BPL system latency is proportional to the distance between TDMSs assigned to the same BPL System Category. Throughput efficiency is proportional to the number of TDMSs assigned consecutively to the same BPL System Category since a TDMS silence margin equal to twice the CDCF margin is centered on the TDMS boundary.

Figure 9:
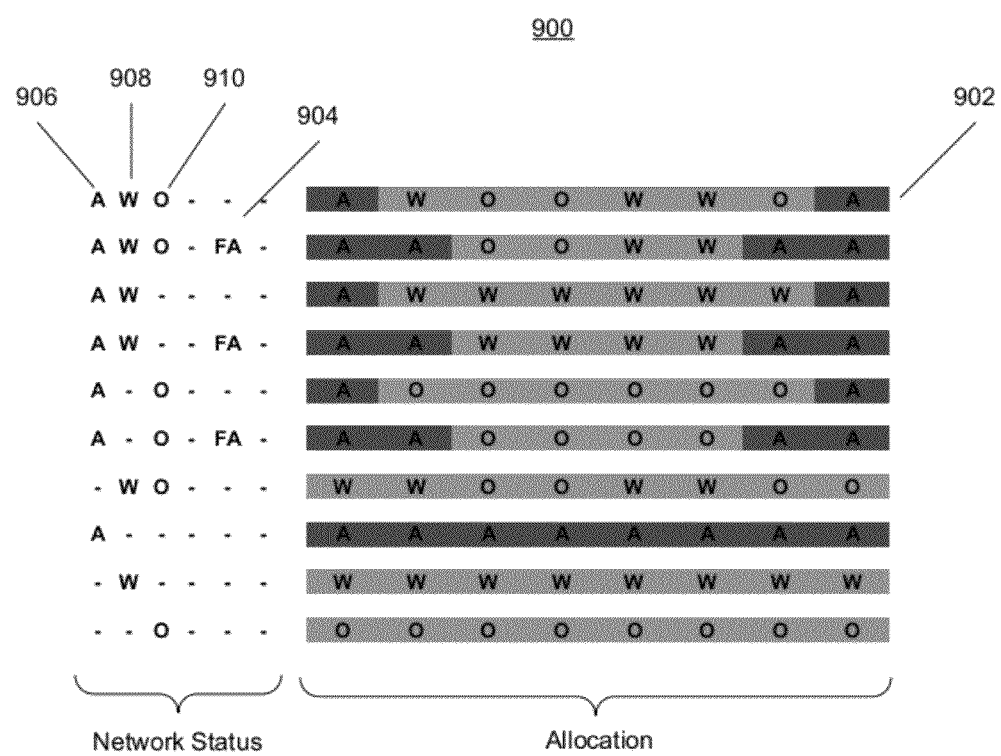
FIG. 9 is a table showing potential resource allocations for the system under various network statuses.
Figure 10:
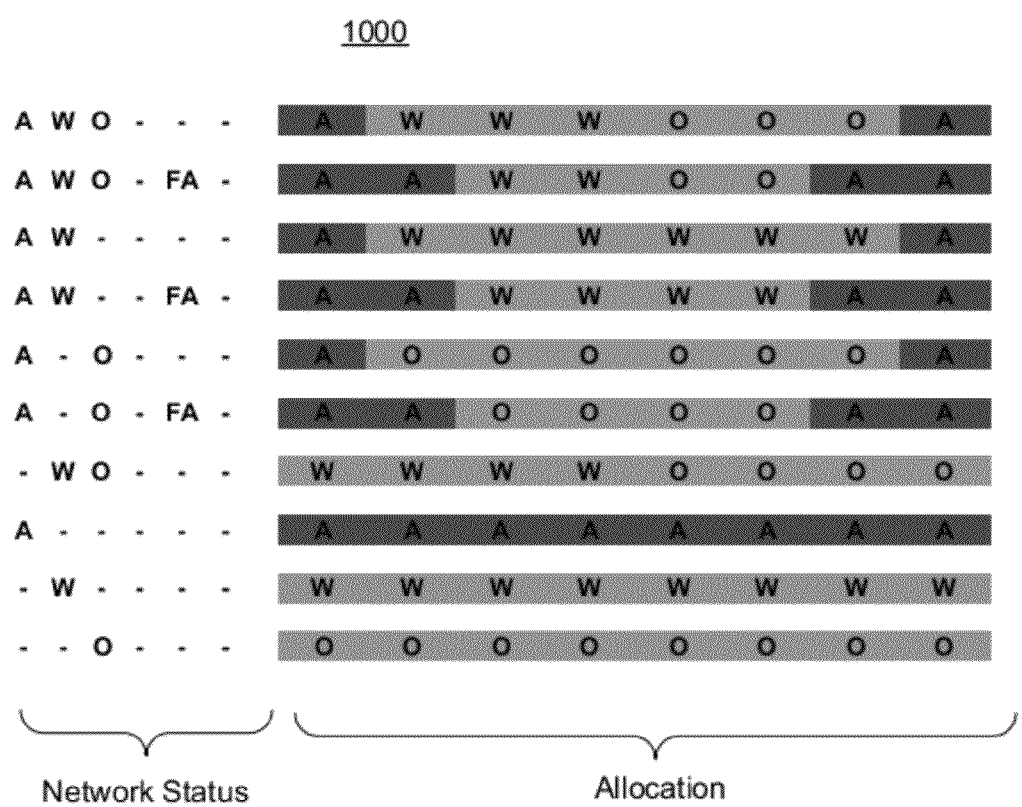
FIG. 10 is table showing potential resource allocations for the system under various network statuses.

These trade-offs may be managed in any of several different ways. FIGS. 9 and 10 show two examples of such trade-offs. In these figures, a possible network status is shown on the left and the corresponding allocations for System Categories is shown on the right. The labels "A" 906, "W" 908 and "O" 910 are used to indicate Access, Wavelet and OFDM System Categories, respectively, being detected in as part of the network status. The label "FA" 904 in the network status signifies that the Access System Category is requesting Full bandwidth.

In one arrangement a Mother Allocation table 900 is shown in FIG. 9. The first row 902 privileges latency at the expense of throughput efficiency by interleaving A, W and O allocations. Since W and O system categories get two discontinuous allocations, efficiency is lower. However, this interleaving also reduces the maximum separation between two W (or two O) allocations, thus reducing latency.

In another arrangement, referring to FIG. 10, a second Mother Allocation table 1000 is shown. The first row has the same number of slots allocated to the respective System Categories as the previous example but it allows better throughput efficiency by providing single contiguous allocations for A, W and O systems. However, this arrangement increases the latency (e.g., the maximum time between consecutive W allocations is longer).

The selected policy should take into account the above mentioned trade-offs.

In some cases, a subset of devices in a given system may not receive signals from one or more of the systems represented in the Mother Allocation. For example, in a network with A, W, and O system categories, two of the O devices may not hear any signals corresponding to the A system category. In that case, the two devices may decide (or make a request) to use the time slots that would otherwise have been allocated to the A system category. In some arrangements, the devices may first need permission from a centralized master device to be allocated the time slots. In other arrangements, even if the devices can receive signals from the A system category but the signals are low (e.g., with a signal-to-noise ratio below a certain threshold, for example 30 dB lower than maximum feeding power), the devices may decide that the chance for interference is minimal and the time slots can still be used.

CDCF Signals

In one arrangement, exemplary Commonly Distributed Coordination Function (CDCF) signals have the following characteristics:

The sampling frequency equal to approximately 100 MHz.
The CDCF signal consists of 16 consecutive OFDM symbols.
Each OFDM symbol, formed by a set of all 'one' BPSK data, is modulated onto the carrier waveforms using a 512-point Inverse Fast Fourier Transform (IFFT)

The first two and last two time domain symbols are then multiplied by a window function W(n) to reduce the out-of-band energy in order to be compliant with the transmit spectrum mask.

The CDCF signals are sent with a power 8 dB lower than the power used for the normal communication transmissions. This is done for the following purposes:

All devices send the CDCF signal simultaneously, so we reduce the transmitted power to avoid non-compliance with radiated emissions Detection of the CDCF is very accurate, it can be detected with negative SNRs, but the purpose of IPP is sharing the channel when there could be interferences. If the energy from one system reaches the other system below the noise then there is no real interference so both systems could share the channel using it simultaneously (avoiding the lost of 50% of the bandwidth). It could be that some times there could be some interference, but this is better than directly losing 50% of the channel.

Figure 11:
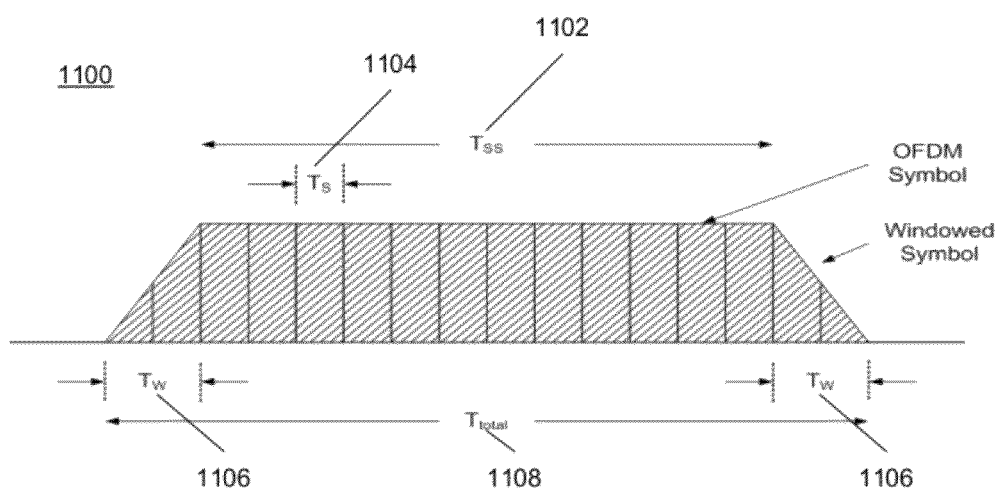
FIG. 11 is a schematic diagram of a CDCF signal.

Referring to FIG. 11, the CDCF signal 1100 may be defined by the following parameters: An IFFT interval 1104, which may include 512 times samples over 5.12 microsections. An ODFM symbol duration 1102, which may include 6144 time samples over 61.44 microseconds. A windowing duration 1106 which may include 1024 time samples over 10.24 microseconds. And a CDCF signal interval 1108 which may include 8192 samples over 81.92 microsections.

Signal Generation

The CDCF signal may be defined in equation form. Let n be defined as sample points in time.

$$S_I(n) = N_c \cdot W(n) \cdot \sum_{C_a} \cos\left(\frac{2 \cdot \pi \cdot C_a \cdot n}{512} + \phi(C_a)\right)$$

$$0 \le n \le 8192$$

$N_c$ is a normalization factor
$W(n)$ is a windowing function
$C_a$ is the carrier index
$\emptyset(C_a)$ is the phase vector Carriers that are always masked in order to meet the Transmit Spectrum Mask inside the range from 2 to 30 MHz are shaded. Additional carriers may be masked by the equipments depending on local regulations.

In some examples, the frequency of each carrier corresponds to the following expression:

$$f_k = k \frac{f_S}{N_{IFFT}} = k \frac{100}{512} \text{ MHz} = k \cdot 195.3125 \text{ kHz}$$

being k the carrier index.

So, the CDCF signals use carriers from 11 to 153 as maximum (they can use a bit less to comply with additional regulation requirements).

Phase Vectors

As discussed above, in some arrangements the IPP protocol establishes the use of four different sets of phases for CDCF signals based on the previously defined OFDM symbol using different phases at each carrier.

Detailed definitions of each phase vector are shown in the tables on FIG. 12. "Start No." in the table shows how the original phase vector shown in the reference table is shifted for the corresponding phase vector. Namely, if the "Start No."

is m, the phase of i-th sub-carrier is equal to the phase reference whose carrier index is (i+m) mod 256.

Other signals are defined as follows:

| Phase Vector | Start No. | PAR (dB) | Use |
|---|---|---|---|
| Phase 1 | 1 | 7.61 | IPP Protocol: access |
| Phase 2 | 2 | 7.97 | IPP Protocol: Wavelet |
| Phase 3 | 14 | 7.47 | IPP Protocol: OFDM |
| Phase 4 | 42 | 7.43 | IPP Protocol: re-sync or access |
| Phase 5 | 47 | 7.70 | Coexistence Protocol |
| Phase 6 | 58 | 7.45 | Coexistence Protocol |

Being the Peak to Average Ratio (PAR) of a signal defined as:

$$\text{Power Sync } PAR = 20 \log_{10} \frac{V_{peak}}{5 V_{rms}} \text{ Point}$$

Figure 13A:
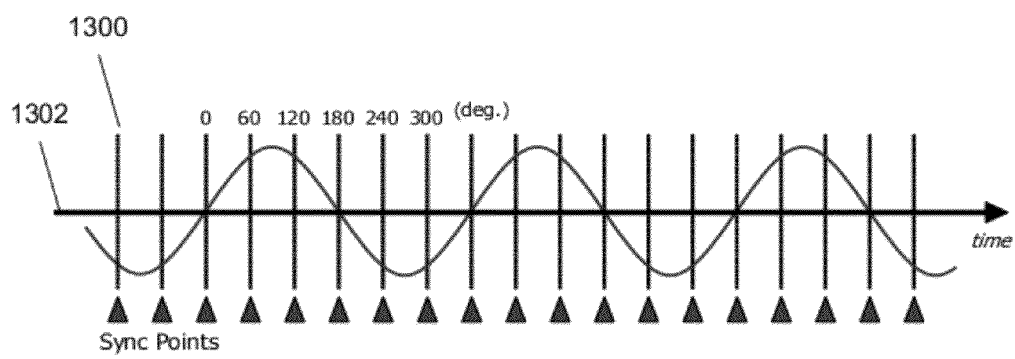
FIG. 13A is a plot of synchronization points for a single phase AC main.
Figure 13B:
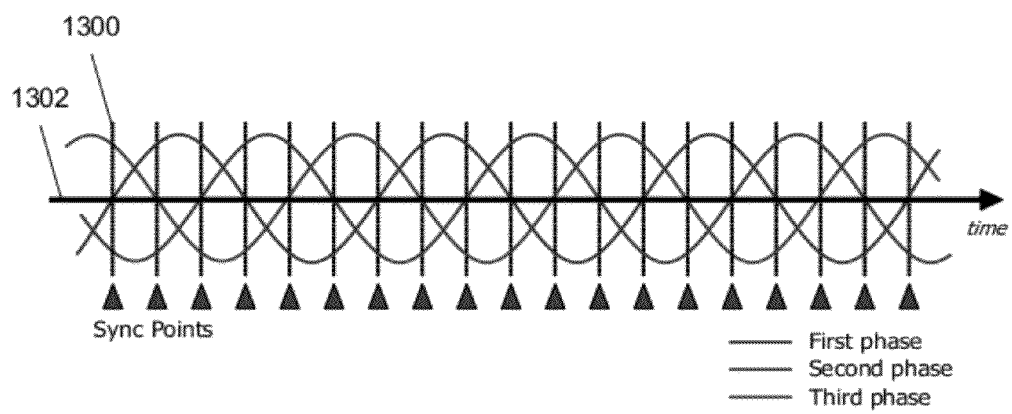
FIG. 13 B is a plot of synchronization points for a three phase AC main.

Referring to FIGS. 13A and 13B, in a BPL system a sync point 1300 may be defined by the zero crossing offset of the AC line current. For example at 0 degrees, 60 degrees, 120 degrees, 180 degrees, 240 degrees, and/or 300 degrees relative to a zero-cross point 1302 of the AC main. Sync Points for single-phase AC mains and three-phase AC mains are shown in FIG. 13A and FIG. 13B, respectively. The first IPP field begins at IPP_OFFSET time after a Sync Point. The accuracy of the zero cross detection circuit, noise on powerline and ambient temperature are some of the factors that affect the accuracy with which a device can determine the Sync Points. Thus, Sync Points observed by different device can be offset from each other.

Start-Up Procedure

A start-up procedure may be utilized when a new device joins a system and when global start-up is required, for example, after a power outage. The start-up procedure assures that the new device is able to detect the presence of other networks already transmitting CDCF signals, and to coordinate with the existing networks.

Start-Up Procedure for an Access System Category

In some arrangements, the Access system category is likely to span a relatively large geographic area and thus may occupy the same medium with any number of in-home systems.

If the Access system category is deployed for first time in the area or when a new access device joins an existing access network, then the access station(s) may follow the start up procedure defined for access networks and may search for CDCF signal from other systems for a start up duration, for example, at every sync point for one to three complete round robin cycles at every possible sync point (in some embodiments every 60 degrees of the AC lines cycle). Once an access device successfully joins an access network and the start up duration has expired, it may send a status indicator message to the HE notifying the presence and status of any in-home systems. Additionally, the HE may send an IPP mode indicator message to the new device indicating the mode of the access network and timing of the IPP signal which it may begin transmitting in the IPP access fields.

If any in-home systems are detected that are not synchronized with the Access system category, then a resynchronization signal may be transmitted in the resynch field of the out of sync in-home systems, as explained below.

The new access devices may be restricted to transmission and reception of management messages for joining the access network and IPP management until the procedure is complete, including resynchronization of any out of sync in-home networks.

Access system categories should have the possibility of initiating a global re-synch (similar to a global start-up after power outage).

Start-Up Procedure for an In-Home System

When a new in-home system is deployed for the first time or when a new in-home device joins an existing in-home network, the in-home devices may follow the start up procedure defined for in-home system categories and may search for CDCF signals from other system categories for IPP_STARTUP_TIME duration at every Sync Point. Once an in-home device successfully joins an in-home system category and the IPP_STARTUP_TIME duration has expired, it may send a CC_IPP.IND message to the manager notifying the presence and status of any access and/or in-home systems. The new device may follow any instructions indicated in the IPP Beacon ENTRY (BENTRY) message contained in period Beacon transmissions made by the master.

If the manager detects the presence of an Access system category directly or from receiving a CC_IPP.IND message, it may execute the resync procedure described below to become synchronized with the Access system category. If the manager detects the presence of an out of sync in-home system category directly or from receiving a CC_IPP.IND message, it may also execute the resync.

In some arrangements, the new in-home devices may be restricted to transmission and reception of management messages for joining the in-home network and IPP management until the procedure describe herein is complete, including resynchronization of any out of sync in-home networks.

Global Start-Up Procedure after Power Outage

In some arrangements, the start-up sequence of systems after a global power outage follows the same order which defines how the IPP windows are assigned to the different system categories (for example, in a BPL system: A, W, O). If access is deployed in area, the Access system category is the first to start up then followed by the In-Home systems. This may be accomplished by a back-off procedure.

In one arrangement, an Access system category device starts signaling in the IPP Window as soon as it is ready. W and O system category devices choose a number N (for example, a number between 5 and 10) and wait N allocation periods to start signaling in the IPP Window. In the meantime the system may listen to the channel to detect other possible CDCF signals. To determine the network status, every system waits three Allocation Periods sending CDCF signals and listening at every Sync Point for other CDCF signals. Once the network status is determined the system may start to use the channel for communication purposes.

Re-Synchronization Procedure

In some arrangements, all devices in a system monitor every sync point whenever the device is not actively transmitting or receiving in order to detect the presence of other systems that may not be synchronized with the system the device belong. In some arrangements, an Access system category cannot be resynchronized. Further, an in-home network that is synchronized with an access network may not resynchronize and may ignore any resync signal transmitted in it's resync field. Resynchronization is handled by master nodes. Below are two examples of two resynchronization procedures for a BPL system with Access system category and In Home Systems sharing the communication medium.

Access Requested Re-Synchronization for an In-Home System

In some arrangements, if a device on the communication medium detects an out of synchronization system on the medium then the device may request a re-synchronization. For example, if an out of synchronization in-home system is detected by a device belonging to an Access system category, the device may immediately send an GE_IPP_STATUS.IND message to the HE notifying that an out of sync in-home network was detected. The access system category device that detected the out of sync in-home system category may transmits in the resync field of the in-home system a predetermined signal (for example a CDCF P3 signal if the in-home system is Wavelet or a CDCF P2 signal if the in-home system is OFDM for several consecutive IPP Periods, for example, for two to five cycles). At the same time, the access system category device may transmits the CDCF signals in the Access IPP Window as it was before to provide the reference to the in-home system to synchronize with.

In-Home Detects Re-Sync in its Window

In another arrangement, an in-home device that detects a CDCF resync signal (for example, P3 if Wavelet or P2 if OFDM) in the resync field of his IPP Window may sends a CC_IPP.IND message to the master indicating a resync signal was detected. The master receiving a CC_IPP.IND message for an in-home network that is not synchronized with an Access system category will update the information in the Central Beacon to stop all IPP signal and data transmissions in the network and will several IPP periods, for example, five period. After the IPP periods, the master will synchronize to an Access system category if detected, or to a detected in-home system that is different from the synchronization before resync was detected and resume network operation as appropriate for the detected network status.

If the in-home system is already synchronized with an Access system category then it may ignore the re-sync request.

In-Home Requested Re-Synchronization for an In-Home System

In another arrangement, if an In-Home system category detects the presence of one or more unsynchronized In-Home system categories and detects that an Access system category is present, then:

a) In-Home system category synchronize their CDCF signals transmission with the Access system category and send the CDCF signals in their corresponding IPP Window (this is also provided as reference for the not synchronized systems to be able to synchronize with the Access system category in case they don't see it).

b) Any device that detects the unsynchronized systems transmits, after a random back-off time interval, a CDCF signal with phase vector P3 for a Wavelet system or P2 for an OFDM system in the re-synchronization field of all detected in-home systems.

c) The Re-sync field may be signaled until the other systems have resynchronized (for example, until the CDCF signal in the first IPP field indicating In-Home system presence, P2 for W, P3 for O, has disappeared during TBD consecutive IPP Windows).

d) When all are synchronized, detect network status and inform master of new status if necessary.

In another arrangement, if an In-Home system category detects the presence of one or more unsynchronized In Home system categories or devices and does not detect any Access system category present, then:

a) In-Home system category selects one of the IH-systems to synchronize with and may send the CDCF signals in their corresponding IPP Window (this is also provided as reference for the not synchronized systems to be able to synchronize with the system chosen as reference in case they don't see it).

b) Any device that detects the unsynchronized systems transmits, after a random back-off time interval, a CDCF signal with phase vector P3 for a Wavelet system or P2 for an OFDM system in the re-synchronization field of the not synchronized detected in-home systems except the chosen one as reference.

c) The Re-sync field is signaled until the other systems have resynchronized (that is, the CDCF signal in the first IPP field indicating In-Home system presence, P2 for W, P3 for O, has disappeared during TBD consecutive IPP Windows) or until a TBD consecutive Allocation periods has passed.

d) If an In-Home system category does not re-synch then it means that it is synched to an Access system category. In this case, In-Home system category requesting re-synch should synchronize with this In-Home system category and send a re-synch signal to all other unsynchronized In-Home system categories.

e) When all are synchronized, detect network status and inform master of new status if necessary.

Time Slot Reuse

In some arrangements, all slaves inform the master about the network status they have detected. The slaves may confer the network status information at start-up, after a re-synch, and whenever network status changes.

The master maintains list of the network status associated with all devices in his domain. The master advertises in the beacon the worst case network status, that is, the network status that is associated with the fewest TDMSs associated with its system.

Any device can, optionally, initiate a CSMA link using the TDMSs corresponding to the network status advertised in the beacon without master intervention and without creating interference to neighboring systems whatever their network status is. A simple handshake between TX and RX allows communicating devices to discover if additional TDMSs are available for communication, for example, when they have a network status that is different from the one advertised in the beacon. These messages may be sent, for example, by piggy-backing the ACK packet with networks status information, or by using management messages.

If a device requires establishing a TDMA link, master intervention is required. Since master maintains the list of network statuses associated with every device in its domain, the master can, optionally, inform TX and RX of their common TDMSs by computing the Usable Time Slot (UST).

FDM/TDM Modes

In some arrangements, an Access system category can switch to FDM mode only if no neighboring In-Home devices are sensed, or if the network status indicates the presence of only In-Home system categories that can support FDM mode (for example, W system categories NOT transmitting P2-P4 and O system categories NOT transmitting P3-P4). If an Access system category wants to initiate FDM mode, appropriate IPP signals are transmitted in Access IPP windows. If neighboring In-Home devices are present and cannot support FDM, they will transmit P4 in the second IPP field. As an alternative, if the In-Home devices that do not support FDM are not sending data they can stop transmitting their IPP in the first field and, as a consequence, change the network status sensed by access devices. If neighboring In-Home devices can support FDM, they can continue to transmit their IPP signal in the first IPP field and switch all data communications in the appropriate higher bandwidth.

If Access devices do not sense an IH IPP, they can start transmitting in FDM mode. However, if network status changes and neighboring IH with no FDM capability devices appear, for example, transmitting a P4 in the second IPP field, the access devices reverts to TDM mode.

An FDM Access system category may indicate its mode and granularity (FDM partial or FDM full) in the appropriate CDCF Fields continuously in its corresponding IPP Window.

An FDM Access system category may monitor first and second Fields in the IPP Wavelet and IPP OFDM windows in order to detect the presence of P1901 Wavelet and P1901 OFDM systems and to detect their FDM capability ("FDM capable" or "not FDM capable").

An FDM Access system category may detect the FDM capability of a In-Home device within a number of seconds of the In-Home device beginning to indicate its presence by transmitting in the appropriate IPP window (for example, in 5 seconds or less).

If the In-Home device indicates that it supports FDM (for example, by signaling P3 in the first field but not signaling in the second field of the appropriate IPP Window) then the In-home system may enter FDM mode and the Access system category may continue to monitor for signals in the IPP Wavelet and IPP FFT windows.

If the In-home device indicates that it does not support FDM mode (for example, by signaling the Phase P4 signal in second field of the appropriate IPP Window) then:

If the Access system category supports TDM mode, then it may enter TDM mode and signal such in Fields ATF and AAF. The Access system category may continue to utilize only the frequency region used in FDM mode rather than the whole bandwidth in the TDMSs exclusively assigned to access.

If the Access system category does not support TDM mode then it may cease all transmission (including CDCF signals).

The only Access devices that must cease all transmission, if proceeding, are those that directly hear the signal that no FDM capability is available (for example, from the CDCF signal P4 from In-Home devices); because those are the access devices that would interfere with the In-Home systems.

In case where an FDM sharing policy is employed, Access system category may send the CDCF signal occupying only the frequencies corresponding to its FDM band. In-Home systems may send the CDCF signal limited to the frequencies corresponding to their FDM band too (e.g., by masking a subset of the carriers). This avoids interferences from one band onto the other because the Access system category in FDM could not signal with the same periodicity that the In-Home systems, (for example, within the same $T_{ipp}$.)

FMI Control Procedures

In some arrangements, the system categories may optionally perform power control on data communications and on CDCF.

Devices may avoid transmitting continuously the CDCF together with all other devices in the network. Devices can make autonomous decision based on network status. If network status contains only one system category, then the device can stop temporarily transmitting the CDCF (for example, transmitting 1 CDCF every TBD IPP Periods) while still continuously scanning for unsynchronized systems or for a new network status. Devices can also transmit a p-persistent CDCF, for example, transmit the CDCF signal with probability p.

If the sensed network status changes and other systems appear, then the device generally resumes sending the CDCF.

What is claimed is:

1. A method for coexistence of multiple devices on a shared communication medium, the method comprising:
   in accordance with a schedule for multiple subsets of the devices that includes at least one respective time slot for each subset, transmitting from a first of the multiple devices, which is in a first subset, a presence signal associated with the first subset within the respective time slot for the first subset, wherein the presence signal is unique with respect to other presence signals each of which are associated with different ones of the subsets of the devices and wherein each of the presence signals is configured to indicate the presence of at least one device in the given subset;
   scanning for the other presence signals during the time slots when the first device is not transmitting the presence signal;
   synchronizing to a detected zero crossing in response to the first device receiving a resynchronization signal from a second device in a second subset different from the first subset, wherein the second device in the second subset transmits the resynchronization signal in response to an indication from at least one of the multiple devices that one or more presence signals are out of synchronization; and
   communicating, by the first device, with devices in the first subset based on presence signals detected during said scanning for the other presence signals from one or more devices in at least one different subset.

2. The method of claim 1, wherein the presence signals associated with different subsets include multiple carrier frequencies modulated using a unique sequence of phases.

3. The method of claim 2, wherein the sequence of phases comprises a sequence of two phase values that differ by 180 degrees.

4. The method of claim 2, wherein the sequence of phases is determined from a stored list of phases starting at a given offset, where each unique sequence of phases starts at a different offset.

5. The method of claim 1, wherein the schedule is a recurring schedule in which the time slots are synchronized to an alternating current line cycle on the shared communication medium.

6. The method of claim 5, wherein the time slots are at different predetermined offsets from a zero crossing of the alternating current line cycle.

7. The method of claim 6, wherein the predetermined offsets are in proximity to the zero crossing of the alternating current line cycle.

8. The method of claim 6, wherein the time slots each include time reserved for one of the presence signals and time margins on either side to allow one of the presence signals to be identifiable when the zero crossing is not accurately detected.

9. The method of claim 1, wherein the resynchronization signal is transmitted from the second device in the second subset in a time slot following a time slot in which the presence signal is transmitted from the first device in the first subset.

10. The method of claim 1, wherein a presence signal is out of synchronization if it is detected outside of a time slot for a subset with which the presence signal is associated.

11. The method of claim 1, wherein the schedule includes at least one presence signal time slot for each subset and time intervals including communication time slots allocated for communicating among devices in a given subset.

12. The method of claim 11, further comprising requesting to share the time intervals among devices of different subsets using either time division multiplexing or frequency division multiplexing based on signals sent during the time slots.

13. The method of claim 12, wherein a device rejects a request to use frequency division multiplexing to select use of time division multiplexing to share the time intervals among devices of different subsets.

14. The method of claim 11, wherein presence signals sent by devices of at least one subset are coordinated by a master device for that subset.

15. The method of claim 14, further comprising devices in a subset communicating detected presence signal information to the master for that subset.

16. The method of claim 1, wherein at least one device in a subset transmits presence signals for that subset.

17. The method of claim 16, wherein multiple devices in a subset transmit presence signals for that subset.

18. The method of claim 17, wherein all devices in a subset transmit presence signals for that subset.

19. The method of claim 17, wherein multiple devices in a subset that transmit presence signals for that subset transmit identical presence signals.

20. The method of claim 19, wherein the identical presence signals add constructively so that the identical presence signals are distinguishable from presence signals transmitted by devices in other subsets.

21. The method of claim 1 further comprising ignoring detected presence signals below a threshold.

22. The method of claim 1, wherein the time slots for transmitting presence signals are separated by time intervals including communication time slots allocated for communicating among devices in a given subset.

23. The method of claim 22, wherein time slots are assigned to a given subset based on subsets identified by the presence signals.

24. The method of claim 22, wherein a first time slot assigned to a first subset and a second time slot assigned to a second subset are separated by a silence margin.

25. The method of claim 22, further comprising assigning time slots to subsets based on at least one of latency and throughput.

26. The method of claim 25, wherein time slots are assigned for a given subset spread over most of the time interval to provide low latency.

27. The method of claim 25, wherein time slots are assigned for a given subset contiguously within the time interval to provide high throughput.

28. The method of claim 22, further comprising the first device in the first subset using a time slot assigned to a third subset when no device in the third subset communicates during one or more slots previously assigned to the third subset.

29. The method of claim 28, wherein the first device in the first subset requests permission from a master device before using the time slot assigned to the third subset.

30. The method of claim 28, wherein the first device in the first subset uses the time slot assigned to the third subset after determining that a signal to noise ratio suggests interference with a device in the third subset is improbable.

31. The method of claim 22, wherein the first device in the first subset requests use of all of the time slots in a given interval for use by one or more devices in the first subset.

32. The method of claim 1, wherein devices in different subsets use different physical layer protocols.

33. The method of claim 32, wherein devices in different subsets use signals that overlap in their spectra.

34. The method of claim 32, wherein at least one of the subsets utilizes orthogonal frequency-division multiplexing.

35. A system, comprising:
a communication medium;
a first subset of devices coupled to the communication medium, wherein the first subset of devices communicate in accordance with a first physical layer protocol; and
a second subset of devices coupled to the communication medium, wherein the second subset of devices communicate in accordance with a second physical layer protocol;
wherein a first of the devices in a given subset of multiple subsets of devices, including at least the first and second subsets of devices, is configured to
transmit a presence signal associated with the given subset within a time slot for the given subset according to a schedule that includes at least one respective time slot for each subset, wherein a presence signal associated with a given subset is configured to indicate the presence of at least one device in the given subset and a presence signal associated with a given subset is unique with respect to presence signals associated with the other subsets,
scan for the presence signals associated with the other subsets during the time slots for the given subset when the first device in the given subset does not transmit the presence signal,
synchronize to a detected zero crossing in response to the first device receiving a resynchronization signal from a device in the second subset, wherein the device in the second subset transmits the resynchronization signal in response to an indication that one or more presence signals are out of synchronization, and
communicate with other devices in the given subset based on presence signals detected during the scan for presence signal associated with the other subsets from one or more devices in at least one different subset.

* * * * *

UNITED STATES PATENT AND TRADEMARK OFFICE
CERTIFICATE OF CORRECTION

PATENT NO. : 8,295,301 B2
APPLICATION NO. : 12/485468
DATED : October 23, 2012
INVENTOR(S) : Lawrence W. Yonge, III et al.

It is certified that error appears in the above-identified patent and that said Letters Patent is hereby corrected as shown below:

Title Page, Item (73) Assignee, should read:
        --Qualcomm Atheros, Inc., San Jose, CA (US)
        Hisilicon Technologies Ltd., Plano, TX (US)
        Panasonic Corporation, Osaka (JP)
        Spidcom Technologies, (FR)
        STMicroelectronics, Inc., Coppell, TX (US)
        Gigle Networks Iberia, S.L., Barcelona (ES)--

Signed and Sealed this
Twenty-third Day of April, 2013

Teresa Stanek Rea
*Acting Director of the United States Patent and Trademark Office*